(12) United States Patent
Ding et al.

(10) Patent No.: US 11,705,716 B2
(45) Date of Patent: Jul. 18, 2023

(54) INPUT POWER CONTROL AND PROTECTION

(71) Applicant: Google LLC, Mountain View, CA (US)

(72) Inventors: Yao Ding, San Jose, CA (US); Arun Jayadev Rao, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/532,317

(22) Filed: Nov. 22, 2021

(65) Prior Publication Data

US 2023/0163588 A1    May 25, 2023

(51) Int. Cl.
*H02H 3/20*   (2006.01)
*H02J 7/00*   (2006.01)

(52) U.S. Cl.
CPC .......... *H02H 3/20* (2013.01); *H02J 7/00308* (2020.01)

(58) Field of Classification Search
CPC ............ H02H 3/20; H02H 3/202; H02H 9/04; H02H 9/046; H02H 7/1222; H02H 7/1252; H02H 9/041; H02H 9/043; H02J 7/00308
USPC ........................................................ 361/91.1
See application file for complete search history.

(56) References Cited

U.S. PATENT DOCUMENTS

| | | | | |
|---|---|---|---|---|
| 8,755,161 | B2 * | 6/2014 | James | ..................... H02H 3/207 361/91.1 |
| 2009/0154039 | A1 | 6/2009 | Tsugawa | |
| 2011/0068849 | A1 * | 3/2011 | Grover | .................. H03K 17/166 327/381 |
| 2012/0287540 | A1 | 11/2012 | Dobkin et al. | |
| 2014/0002941 | A1 | 1/2014 | James | |
| 2015/0043117 | A1 * | 2/2015 | Xiang | ..................... A24F 40/90 361/91.5 |
| 2015/0256152 | A1 | 9/2015 | Ausseresse et al. | |
| 2016/0254662 | A1 * | 9/2016 | Dawley | ..................... H02H 3/20 361/93.1 |
| 2016/0294180 | A1 * | 10/2016 | Pagano | ..................... H02H 3/20 |
| 2017/0365995 | A1 * | 12/2017 | Bahl | .................. H03K 17/0822 |
| 2020/0036182 | A1 * | 1/2020 | Hanson | ..................... H02H 3/22 |
| 2021/0226444 | A1 * | 7/2021 | Fang | .................. H03K 17/0822 |

FOREIGN PATENT DOCUMENTS

| | | |
|---|---|---|
| FR | 2838971 | 10/2003 |
| WO | 2021016080 A1 | 1/2021 |

OTHER PUBLICATIONS

"Extended European Search Report", EP Application No. 22192471.5, dated Apr. 11, 2023, 7 pages.

* cited by examiner

*Primary Examiner* — Danny Nguyen
(74) *Attorney, Agent, or Firm* — Colby Nipper PLLC

(57) ABSTRACT

The present disclosure describes a system and method for protecting an electronic device from high voltages that may exceed tolerance limits for circuitry within the electronic device. A protection circuit blocks high voltages from the device components through gating techniques. Such gating techniques may similarly be used to control whether power is received by the electronic components when an error condition is detected by a control unit.

20 Claims, 5 Drawing Sheets

INPUT POWER CONTROL AND PROTECTION

BACKGROUND

Wearable products are typically physically small enclosures with elegant industrial design. The circuitry within such products often has voltage input limits. A typical voltage supplied by a USB type-A charging cable may be around 5V, which may be within the voltage input limits. Other USB Type C power sources, such as PD compliant Type-C however, may deliver up to 20V after negotiation, which may exceed the voltage input limits for the circuitry. Such excessive power delivery can result in damage to the circuitry and the wearable products.

BRIEF SUMMARY

The present disclosure provides for input voltage protection, without blockage of a power path. In particular, an AC signal is used to turn off a transistor coupled across a power path, such that the power does not pass through the transistor. Such transistor may also be turned off in response to receipt of a voltage exceeding a predetermined threshold.

One aspect of the disclosure provides a voltage protection circuit for an electronic device, comprising a control line coupled to a first transistor, an input power line, and a power interrupt transistor coupled across the input power line and electronically coupled to the first transistor, wherein receipt of a square wave signal at the first transistor through the control line causes the power interrupt transistor to turn off, thereby interrupting the flow of power on the input power line.

The voltage protection circuit may further comprise a capacitor coupled across junctions of the first transistor, wherein receipt of the square wave signal at the first transistor causes the capacitor to drain. The circuit may further comprise a second transistor coupled between the capacitor and the power interrupt transistor, wherein the second transistor turns on when the capacitor is drained. The power interrupt transistor turns off when the second transistor turns on.

According to some examples, the voltage protection circuit may further comprise a resistor coupled between the power line input and the second transistor, the resistor having an ohmic value based on voltage tolerance limits of the electronic device, wherein receipt of voltages exceeding a threshold trigger activation of the second transistor.

According to some examples, the control line may be coupled to a control unit and the square wave signal is received from the control unit in response to detection of an error.

Another aspect of the disclosure provides an electronic device, comprising an input port, electronic components, and a voltage protection circuit between the input port and the electronic components. The voltage protection circuit comprises a control line coupled to a first transistor, an input power line, a power interrupt transistor coupled across the input power line and electronically coupled to the first transistor, wherein receipt of a square wave signal at the first transistor through the control line causes the power interrupt transistor to turn off, thereby interrupting the flow of power on the input power line.

Yet another aspect of the disclosure provides a method of operating an electronic device, comprising receiving a voltage at a power line of the electronic device, the power line coupled between an input and circuitry of the electronic device, detecting, at a control unit, when an error condition exists, and transmitting, in response to detection of the error condition, a square wave signal through a control line to a first transistor, the square wave signal causing a power interrupt transistor to turn off, the power interrupt transistor blocking receipt of the voltage by the circuitry of the electronic device. Transmitting the square wave signal may cause a capacitor coupled across the first transistor to discharge. Discharging the capacitor may activate a second transistor, the activation of the second transistor causing the power interrupt transistor to turn off.

According to some examples, the control line remains steady when the error condition is not detected by the control unit.

According to some examples, the method may further comprise activating a second transistor when the received voltage exceeds a predetermined threshold. Even further, the method may comprise turning off the second transistor when the received voltage no longer exceeds the predetermined threshold.

DETAILED DESCRIPTION

The present disclosure describes a system and method for protecting an electronic device from high voltages that may exceed tolerance limits for circuitry within the electronic device. A protection circuit blocks high voltages from the device components through gating techniques. Such gating techniques may similarly be used to control whether power is received by the electronic components when an error condition is detected by a control unit.

Example Systems

Figure 1A:
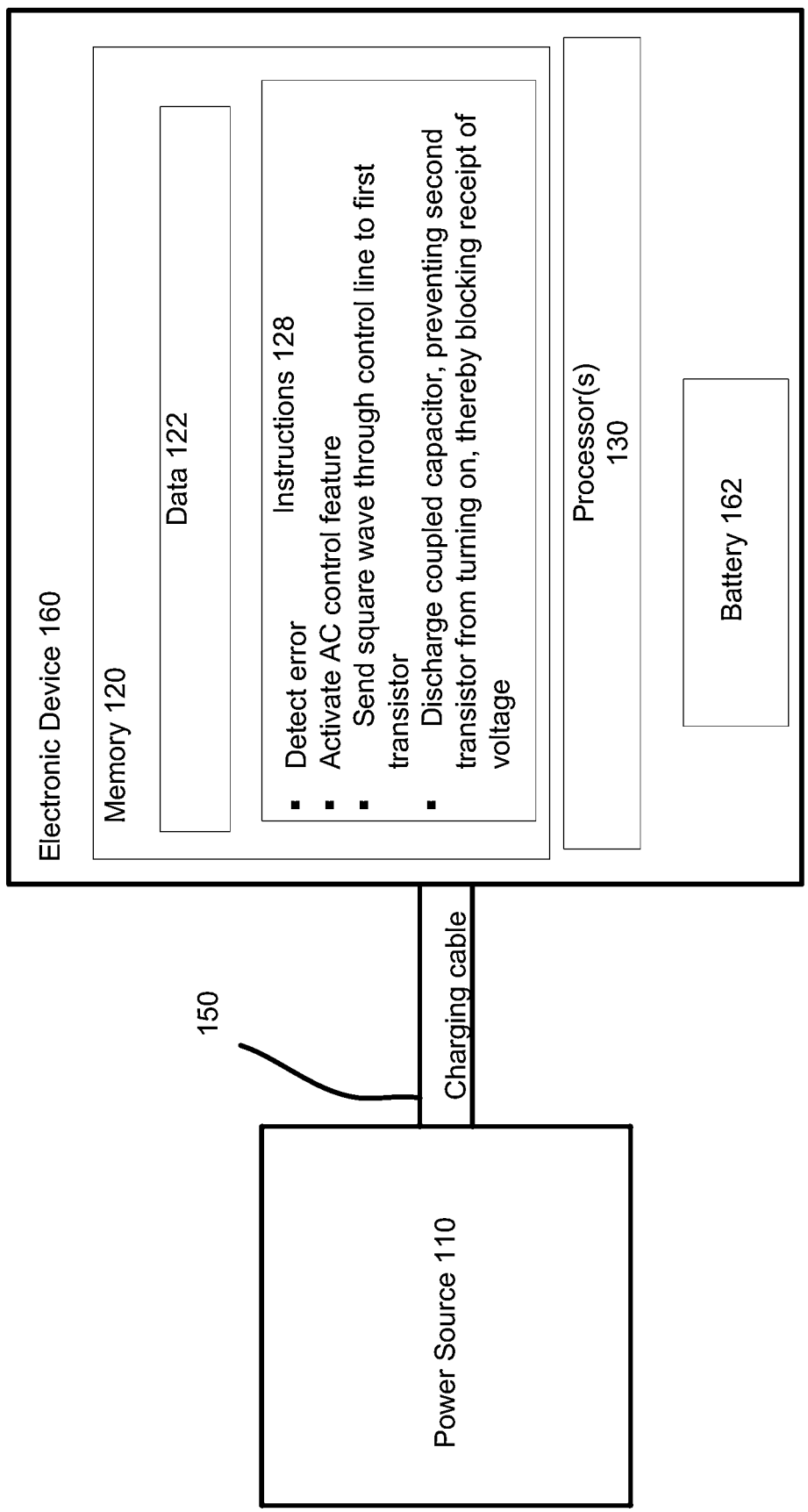
FIG. 1A is a functional block diagram illustrating an example system according to aspects of the disclosure.
Figure 1B:
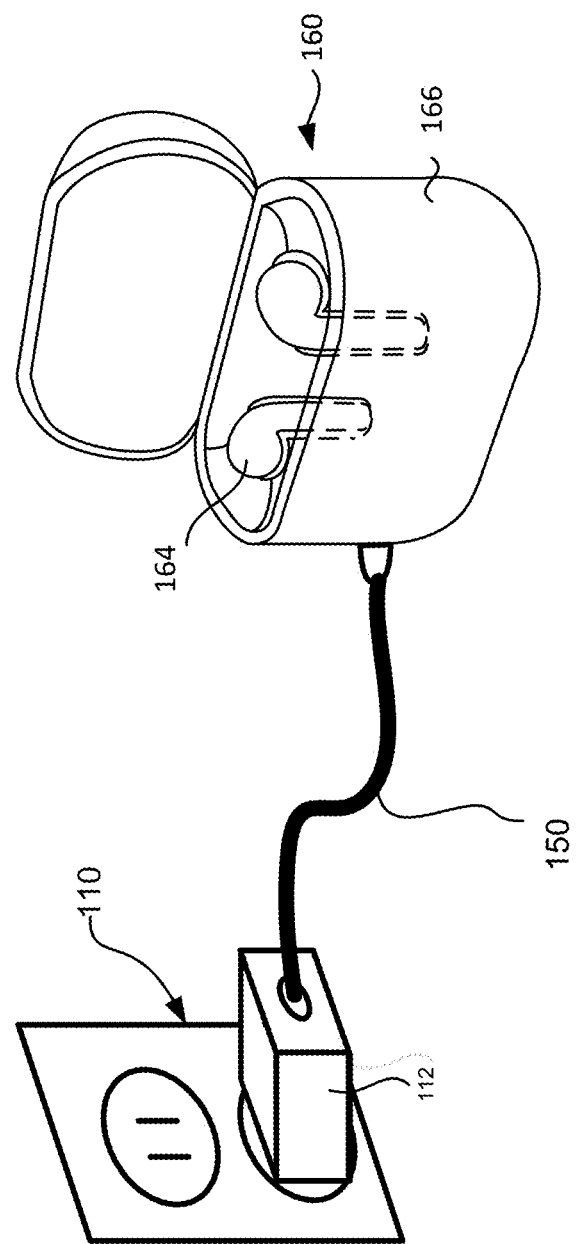
FIG. 1B is an example pictorial diagram of the system of FIG. 1A.

FIGS. 1A-1B illustrate an example of a power source 110 which supplies power to an electronic device 160. For example, the power source 110 may supply power through a cable 150, such as a charging cable. In some examples, the charging cable may be connected through an intermediate device, such as a charging brick 112 inserted into a wall outlet, a laptop or other computing device connected to a power source, etc.

The power source 110 may be, for example, a battery, an electrical outlet, a computing device, or any other type of device capable of delivering voltage to another device.

The cable 150 may be, for example, a USB cable or any other type of cable capable of delivering voltage from the power source 110 to the electronic device 160. The cable may include any of a variety of types of connectors at either end, such as USB-A, USB-C, micro-USB, mini-USB, 8-pin lightning, etc.

The electronic device 160 may be any type of electronic device, including wearable devices such as earbuds 164, a smartwatch, a headset, smartglasses, smart helmets, rings, pendants, clothing, etc., or non-wearable devices, such as phones, home assistant devices, displays, speakers, etc.

According to some examples, the electronic device 160 may include a case 166. For example, the case 166 may be used to house an electronic accessory, such as earbuds 164, when the accessory is not in use. In addition, the case 166 may be used to deliver a charge to the accessory. For example, the accessory may include electrical contacts that establish an electrical connection with the case when the accessory is housed within the case. Moreover, the voltage supplied to the accessory from the power source 110 and through the charging cable 150 may be supplied through the case. For example, the case 166 may include an input for receiving the charging cable 150, and may relay the charge received from the power source 110 to the earbuds 164. According to some examples, the case 166 may include a battery, capacitor, or electronic components for storing a charge from the power source 110 for later use in charging the earbuds 164 when the earbuds 164 are housed within the case 166 but the charging cable 150 is no longer connected. While the example of FIG. 1B illustrates earbuds within a case, it should be understood that the electronic device 160 may include any of a number of electronic devices, including wearable and non-wearable electronic devices.

The electronic device 160 may include one or more processors 130, one or more memories 120, as well as other components. For example, the electronic device 160 may include a battery 162.

The memory 120 may store information accessible by the one or more processors 130, including data 122 and instructions 128 that may be executed or otherwise used by the one or more processors 130. For example, memory 120 may be of any type capable of storing information accessible by the processor(s), including a computing device-readable medium, or other medium that stores data that may be read with the aid of an electronic device, such as a volatile memory, non-volatile as well as other write-capable and read-only memories. By way of example only, memory 120 may be a static random-access memory (SRAM) configured to provide fast lookups. Systems and methods may include different combinations of the foregoing, whereby different portions of the instructions and data are stored on different types of media.

The data 122 may be retrieved, stored, or modified by the one or more processors 130 in accordance with the instructions 128. Although the claimed subject matter is not limited by any particular data structure, the data may be stored in computing device registers, in a relational database as a table having a plurality of different fields and records, XML documents or flat files. The data may also be formatted in any computing device-readable format.

The instructions 128 may be any set of instructions to be executed directly (such as machine code) or indirectly (such as scripts) by the one or more processors 130. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The one or more processors 130 may be microprocessors, logic circuitry (e.g., logic gates, flip-flops, etc.) hard-wired into the device 110 itself, or may be a dedicated application specific integrated circuit (ASIC). It should be understood that the one or more processors 130 are not limited to hard-wired logic circuitry, but may also include any commercially available processing unit, or any hardware-based processors, such as a field programmable gate array (FPGA). In some examples, the one or more processors 130 may include a state machine.

When instructions 128 are executed by the one or more processors 130, the one or more processors may detect an error condition and activate a power control feature in response. For example, the power control feature may include transmitting a square wave signal through a control line to a first transistor, causing a capacitor coupled to the first transistor to drain, which in turn keeps second transistor on, subsequently prevents a third transistor from turning on, thereby blocking receipt of input voltage.

Figure 2:
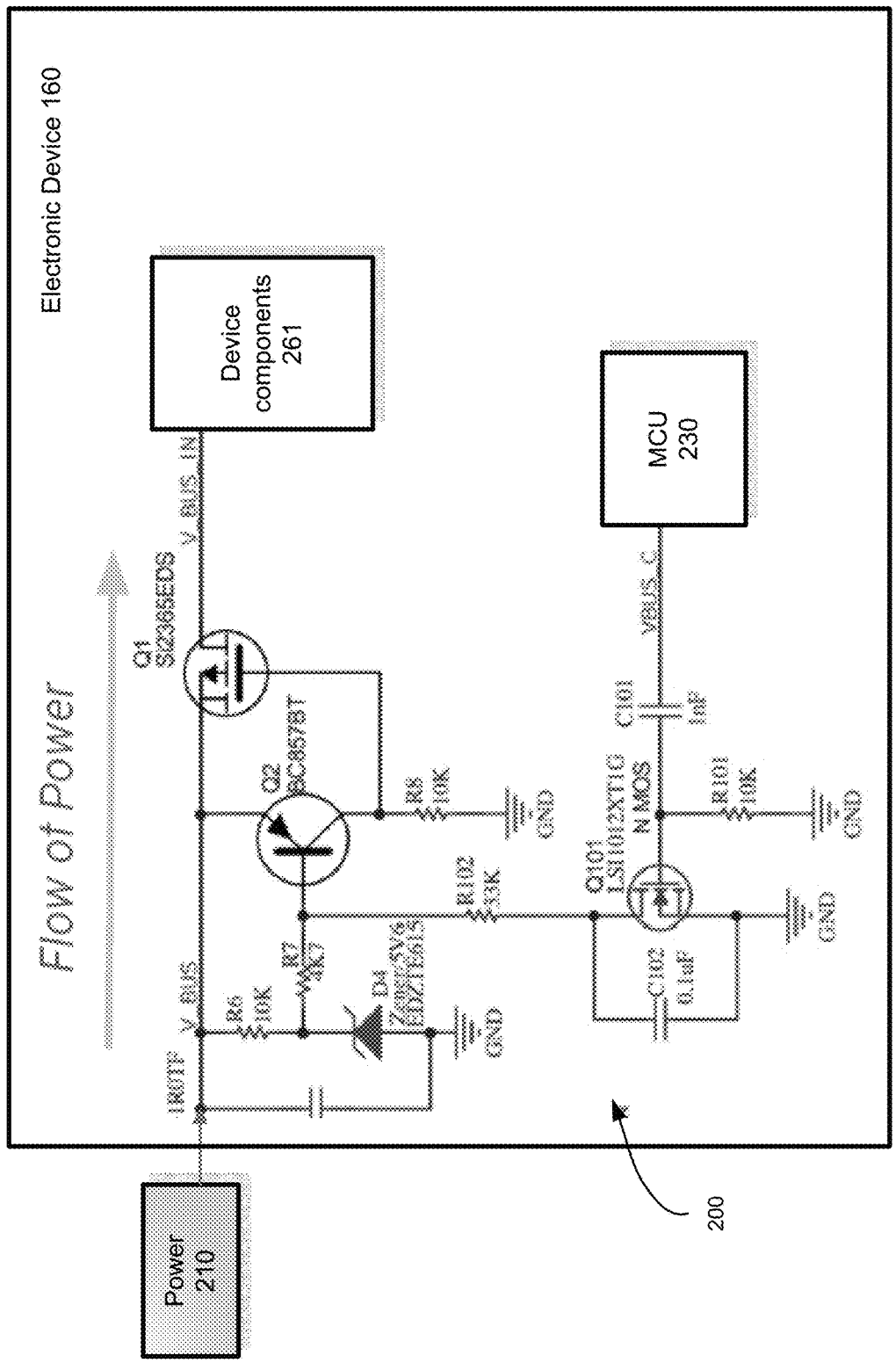
FIG. 2 is an example circuit diagram according to aspects of the disclosure.

FIG. 2 provides an example block diagram illustrating electronic device 160 with power control circuit 200 positioned between a power input, such as a charging cable input port, and other device components 261. As described below, gating components, such as transistors, in-between power 210 and the device components 261 can stop current flow when an input voltage is too high, thereby preventing damage to the device components 261.

The circuit 200 includes a control line VBUS_C coupled to a micro control unit (MCU) 230. As shown, the control line VBUS-C is coupled to a first transistor Q101, and a capacitor C102 is coupled in parallel across junctions of the first transistor Q101. The capacitor C102 is further coupled to second transistor Q2 between input power line V_BUS and third transistor Q1 gate. A third transistor Q1 coupled to the second transistor Q2 and the device components 261 interrupts input power line V_BUS and outputs modified input power line V_BUS_IN.

During normal operation, the input V_BUS line is at normal voltage of 5V. The D4 Zener diode will not conduct, therefore Q2 base is biased to V_BUS level by R6 and R7, Q2 is off. The VBUS_C line is at a steady level, no current can pass DC blocking capacitor C101, Q101 gate is pulled to ground by R101, and Q101 is off. Q1 will not draw current from Q2 base. Q2 keeps being off, then Q1 gate is pulled to ground by R8, Q1 is on and supply current to Device 261.

The MCU may monitor for and detect errors. For example, the MCU can detect a condition that will require powering down the circuit. MCU is monitoring the voltage on V_BUS, V_BUS_IN and several other nodes, and can generate an event to turn off power path.

When an error is detected, the MCU 230 sends a square wave to control line VBUS_C, for example, by sending an AC signal that toggles on and off repeatedly. In response, Q101 toggles on at the positive edge and discharges capacitor C102, and keeps the node low. Second transistor Q2 is turned on, and third transistor Q1 is off. This AC control feature protects against error in the MCU at corner conditions, such as during booting, or when there is power brown out. If there were no C101, high level on control line VBUS_C may turn on first transistor Q101, keeping third transistor Q1 in the "off" state and cutting power to system, thereby preventing the circuit from starting.

If a high voltage is received from the power source 210, the high voltage will go through resistor R6 and Zener diode D4. If the voltage is more than a predetermined threshold, such as more than 6.5V, the resistor R6 will have voltage drop above a second threshold, such as more than 0.7 which will cause second transistor Q2 to turn on, which in turn causes third transistor Q1 to shut off. As a result, no power passes through the third transistor Q1 or along modified input power line V_BUS_IN to the device components 261.

The predetermined threshold voltage triggering second transistor Q2 to turn on may be determined based on, for example, acceptable voltage limits for the device components 261. This predetermined threshold voltage may be used to determine values for the resistor R6. For example, where the predetermined threshold voltage is 6.5V, the value of resistor R6 may be 10 k ohms. However, if the predetermined threshold voltage were set to be higher or lower than 6.5V, the value of resistor R6 may be correspondingly adjusted such that the resulting voltage drop would cause the second transistor Q2 to turn on.

The MCU 230 may be an MCU or any other type of processing unit, for example, a System On Chip (SOC), an ASIC, or a FPGA/CPLD, etc.

The first transistor Q101 as illustrated in the example of FIG. 2 is a metal oxide semiconductor field effect transistor (MOSFET). In other examples, the first transistor Q101 may be a field effect transistor (FET), bipolar junction transistor (BJT), or any other type of transistor. Similarly, while second transistor Q2 is shown as a BJT and third transistor Q1 is shown as a MOSFET, other types of transistors may be used in other examples.

Example Methods

In addition to the operations described in connection with the systems above, various operations will now be described in connection with example methods. It should be understood that the following operations do not have to be performed in the precise order described below. Rather, various operations can be handled in a different order or simultaneously, and operations may also be added or omitted.

Figure 3:
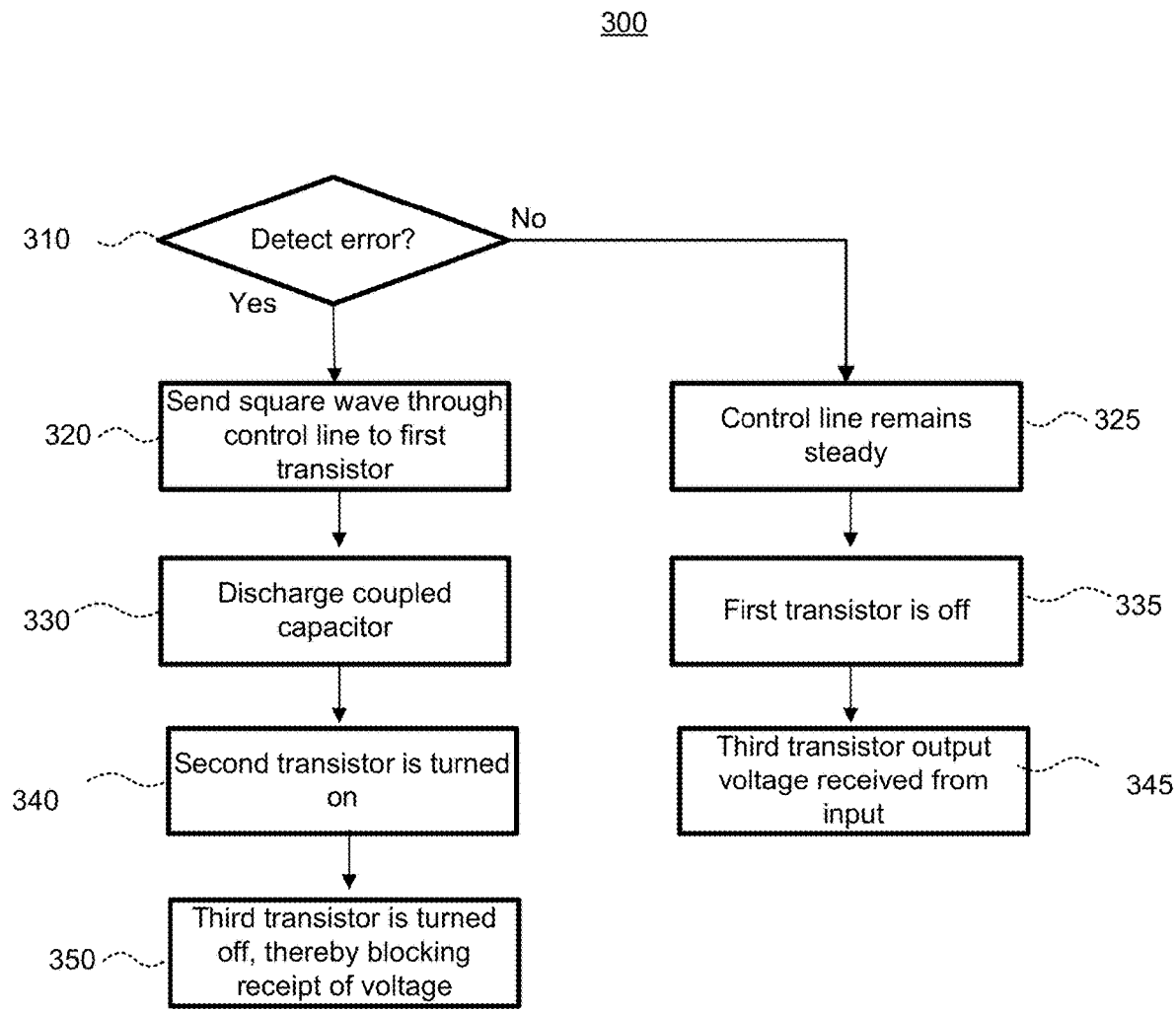
FIG. 3 is a flow diagram illustrating an example method according to aspects of the disclosure.

FIG. 3 provides a flow diagram illustrating an example method 300 of operating an electronic device with an AC power control feature.

In block 310 it is determined whether an error is detected. For example, an MCU may determine whether an error condition exists. Examples of such error conditions include any condition that would require powering down the circuit.

If a failure is detected in block 310, the MCU sends a square wave through a control line to a first transistor (block 320). The square wave causes a capacitor coupled across the transistor to discharge (block 330). As a result of the discharged capacitor, a second transistor coupled to the capacitor is turned on (block 340). This causes a third transistor, coupled to the second transistor and the input power line, to turn off (block 350). When the third transistor is off, it interrupts the flow of power across the input power line, thereby preventing the power from reaching other components of the electronic device.

If a failure is not detected at block 310, the electronic device operates in a default operating state. In this default operating state, the control line from the MCU remain steady (block 325). As such, the first transistor remains off (block 335), the second transistor remains off, and the third transistor remains on, allowing the voltage received from the input to pass through the third transistor to the other components of the electronic device (block 345).

Figure 4:
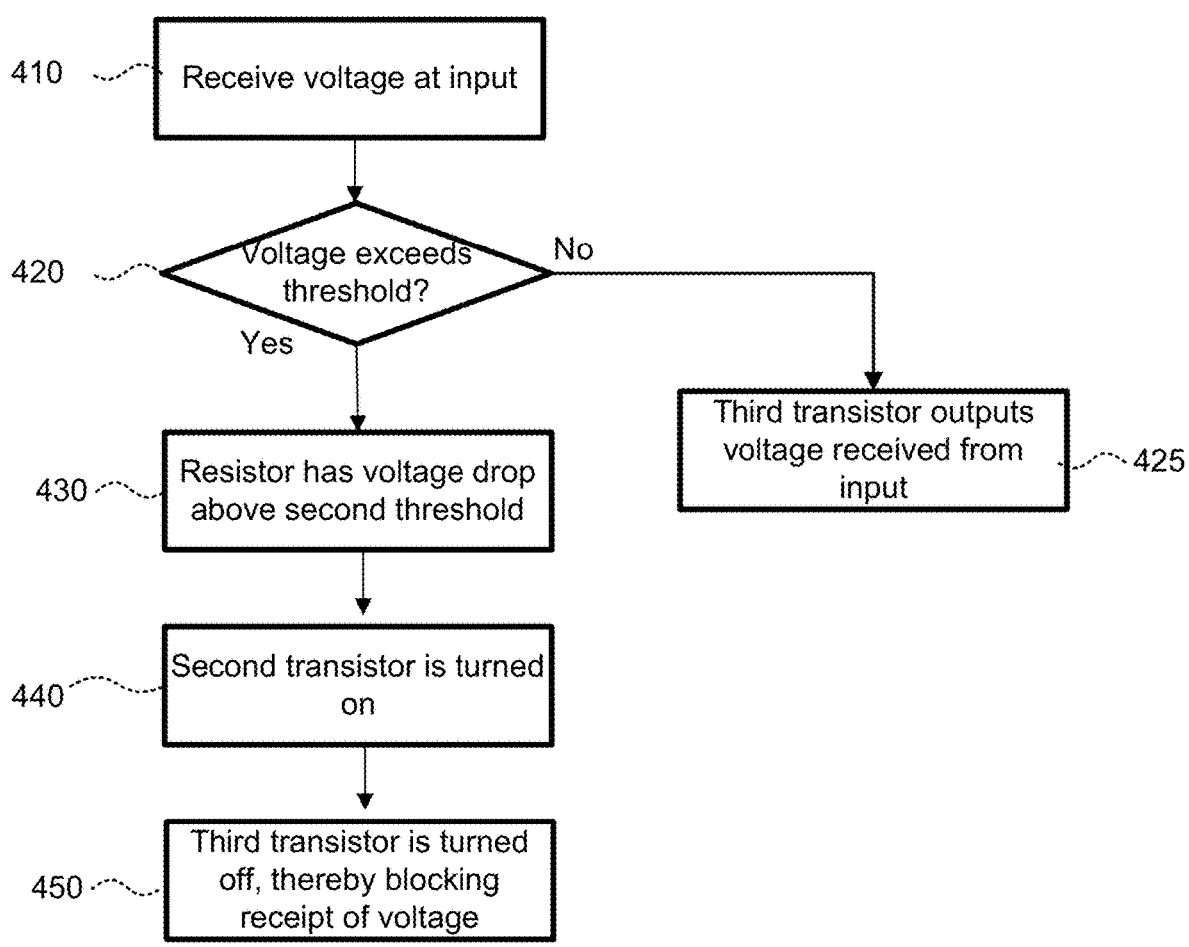
FIG. 4 is a flow diagram illustrating an example method according to aspects of the disclosure.

FIG. 4 provides a flow diagram illustrating an example method 400 of operating the electronic device. This method relates to handling excessive voltages received at the input, wherein the excessive voltages exceed a tolerance limit for circuitry in the electronic device.

In block 410, the voltage is received at the input. If the voltage exceeds a first threshold (block 420), a resistor coupled to the input will have a voltage drop exceeding a second threshold (block 430). For example, the resistor may be selected to have an ohmic value based on the first threshold, such that a resulting voltage drop will exceed the second threshold when the received voltage exceeds the first threshold.

In block 440, a second transistor coupled to the resistor is turned on as a result of the voltage drop exceeding the second threshold. In block 450, the turning on of the second transistor causes a third transistor to turn off. As the third transistor interrupts a power line, such that first and second junctions of the third transistor are coupled to the power line between an input for the power and other circuitry, turning off the third transistor blocks receipt of voltage by the other circuitry.

If the voltage does not exceeds the threshold in block 420, the electronic device operates in a default mode, wherein the third transistor outputs the voltage it receives from the input (block 425).

The foregoing systems and methods are advantageous in that they provide a mechanism for protection of a wearable device from high voltage input that could potentially damage components within the device. The protection operates without pins becoming stuck or the device becoming stuck in an off state.

While some of the foregoing examples are described in relation to a case delivering a reset to an accessory, such as a pair of earbuds, it should be understood that other examples of the system and method may include any of a number of other electronic devices.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A voltage protection circuit for an electronic device, comprising:
   a control line coupled to a first transistor;
   an input power line;
   a power interrupt transistor coupled to the input power line and electronically coupled to the first transistor, the power interrupt transistor configured to turn off respondent to the first transistor receiving;
   a square wave signal through the control line, thereby interrupting the flow of power on the input power line; and
   a second transistor coupled between the power interrupt transistor and the first transistor, the second transistor configured to turn on respondent to the first transistor receiving the square wave signal through the control line.

2. The voltage protection circuit of claim 1, further comprising:
   a capacitor coupled across junctions of the first transistor, wherein receipt of the square wave signal at the first transistor causes the capacitor to drain.

3. The voltage protection circuit of claim 1, wherein the power interrupt transistor is configured to turn off respondent to the second transistor turning on.

4. The voltage protection circuit of claim 1, further comprising a resistor coupled between the input power line and the second transistor, the resistor having an ohmic value based on voltage tolerance limits of the electronic device, wherein receipt of voltages exceeding a threshold trigger activates the second transistor.

5. The voltage protection circuit of claim 1, wherein the control line is coupled to a control unit and the square wave signal is received from the control unit in response to detection of an error.

6. The voltage protection circuit of claim 1, wherein the first transistor is a MOSFET.

7. An electronic device, comprising:
    an input port;
    electronic components; and
    a voltage protection circuit between the input port and the electronic components, the voltage protection circuit comprising:
    a control line coupled to a first transistor;
    an input power line;
    a power interrupt transistor coupled across the input power line and electronically coupled to the first transistor, the power interrupt transistor configured to turn off respondent to the first transistor receiving a square wave signal through the control line, thereby interrupting the flow of power on the input power line; and
    a second transistor coupled between the power interrupt transistor and the first transistor, the second transistor configured to turn on respondent to the first transistor receiving the square wave signal through the control line.

8. The electronic device of claim 7, wherein the voltage protection circuit further comprises a capacitor coupled across junctions of the first transistor, wherein receipt of the square wave signal at the first transistor causes the capacitor to drain.

9. The electronic device of claim 8, wherein the second transistor turns on when the capacitor is drained.

10. The electronic device of claim 7, wherein the power interrupt transistor is configured to turn off respondent to the second transistor turning on.

11. The electronic device of claim 7, wherein the voltage protection circuit further comprises a resistor coupled between the input power line and the second transistor, the resistor having an ohmic value based on voltage tolerance limits of the electronic device, wherein receipt of voltages exceeding a threshold trigger activates the second transistor.

12. The electronic device of claim 7, wherein the control line is coupled to a control unit and the square wave signal is received from the control unit in response to detection of an error.

13. The electronic device of claim 7, wherein the electronic device is a wearable electronic device.

14. A method of operating an electronic device, comprising:
    receiving a voltage at a power line of the electronic device, the power line coupled between an input and circuitry of the electronic device;
    detecting, at a control unit, when an error condition exists; and
    transmitting, in response to detection of the error condition, a square wave signal through a control line to a first transistor, the square wave signal causing:
        a power interrupt transistor to turn off, the power interrupt transistor blocking receipt of the voltage by the circuitry of the electronic device; and
        a second transistor to turn on, the second transistor coupled between the power interrupt transistor and the first transistor.

15. The method of claim 14, wherein transmitting the square wave signal causes a capacitor coupled across junctions of the first transistor to discharge.

16. The method of claim 14, wherein the control line remains steady when the error condition is not detected by the control unit.

17. The method of claim 14, further comprising activating a second transistor when the received voltage exceeds a predetermined threshold.

18. The method of claim 17, further comprising turning off the second transistor when the received voltage no longer exceeds the predetermined threshold.

19. The method of claim 14, wherein the power interrupt transistor is configured to turn off respondent to the second transistor turning on.

20. The voltage protection circuit of claim 5, further comprising a capacitor coupled to the control line between the first transistor and the control unit.

* * * * *

UNITED STATES PATENT AND TRADEMARK OFFICE
CERTIFICATE OF CORRECTION

PATENT NO. : 11,705,716 B2
APPLICATION NO. : 17/532317
DATED : July 18, 2023
INVENTOR(S) : Ding et al.

It is certified that error appears in the above-identified patent and that said Letters Patent is hereby corrected as shown below:

In the Specification

Column 6, Line 54-55, after "transistor" before "through" delete "receiving; a square wave signal" insert --receiving a square wave signal--

Signed and Sealed this
Third Day of October, 2023

Katherine Kelly Vidal
*Director of the United States Patent and Trademark Office*